United States Patent
Cook et al.

[15] 3,694,123
[45] Sept. 26, 1972

[54] APPARATUS FOR MAKING A TUBE OF PLASTIC FILM

[72] Inventors: Richard Erwin Cook, Richmond, Va.; Donald Lewis Fitzhugh, Topeka, Kans.; George Wilson Lucky, Richmond, Va.

[73] Assignee: E. I. duPont de Nemours and Company, Wilmington, Del.

[22] Filed: Nov. 11, 1971

[21] Appl. No.: 197,801

Related U.S. Application Data

[60] Continuation of Ser. No. 867, 750, Oct. 20, 1969, abandoned.

[52] U.S. Cl. .................425/207, 264/209, 425/381
[51] Int. Cl. .................................................B29f 3/02

[58] Field of Search......425/204, 206, 207, 208, 209, 425/380, 381; 264/209

*Primary Examiner*—J. Spencer Overholser
*Assistant Examiner*—Norman E. Lehrer
*Attorney*—Hoge T. Sutherland

[57] ABSTRACT

An apparatus for making plastic film wherein flowable polymeric material is extruded through an extrusion die in the form of a tube of film. A die adapter is provided for interrupting the tubular flow of the polymeric material as it moves from an infeed means to the extrusion die and for forcing the flow into a flow path having a single inlet to form an intermediate stream flow whereby to obtain improved flow characteristics.

5 Claims, 11 Drawing Figures

INVENTORS
RICHARD ERWIN COOK
DONALD LEWIS FITZHUGH
GEORGE WILSON LUCKEY

BY Hoge J. Sutherland
ATTORNEY

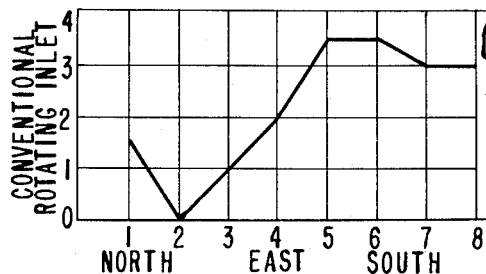
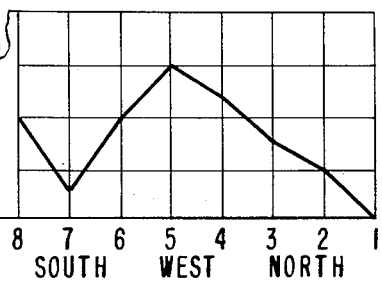
FIG. 8A
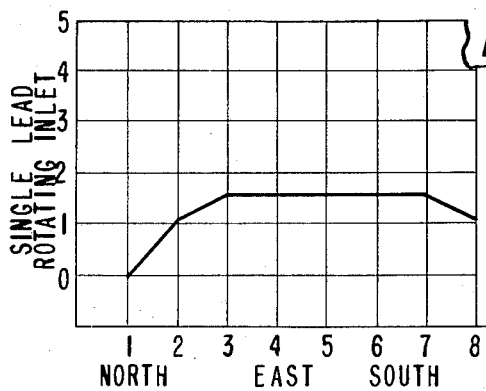
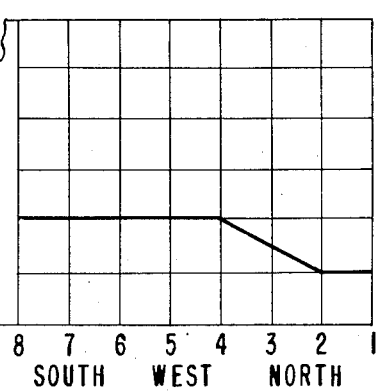
FIG. 8B
FIG. 9A
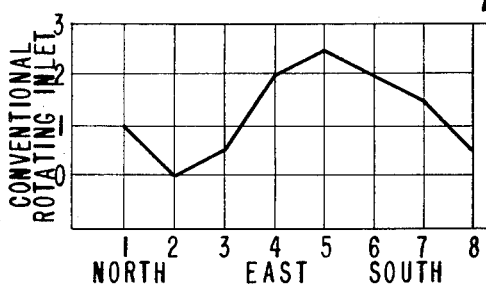
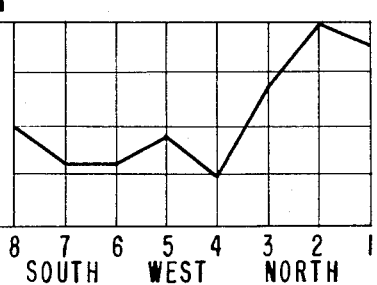
FIG. 9B
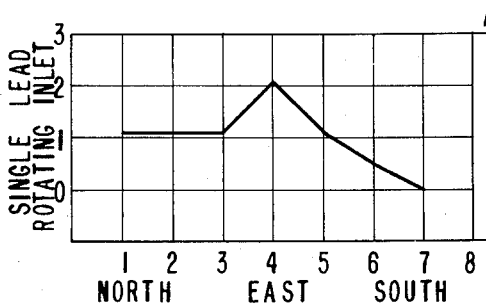
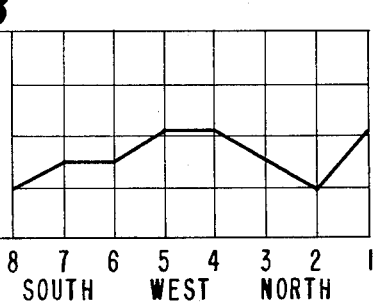
INVENTORS
RICHARD ERWIN COOK
DONALD LEWIS FITZHUGH
GEORGE WILSON LUCKEY
BY Hoge T. Sutherland
ATTORNEY

APPARATUS FOR MAKING A TUBE OF PLASTIC FILM

This is a continuation, of application, Ser. No. 867,750, filed Oct. 20, 1969 now abandoned.

BACKGROUND OF THE INVENTION

1. Field of the Invention

This invention is a method of and apparatus for making, by extrusion, a tube of plastic film in which the flow of the molten polymeric material in the extrusion apparatus is guidingly moved in a novel manner and in a novel flow path from the inlet to the outlet of such apparatus to obtain desired flow characteristics.

2. Description of the Prior Art

There have been numerous attempts to control polymeric melt flow in an extrusion apparatus in making tubular film.

It is known, for example, to make a tube of plastic film, using inner and outer die adapter members defining alternate helical and spiral paths to improve flow in an extrusion apparatus, as shown in U.S. Pat. No. 3,376,605 to Beattie.

Another example is U.S. Pat. No. 3,418,687 to Albert, which shows an extruding apparatus with a double bifurcated lead inlet with a die adapter to improve flow characteristics.

While these patents and others show polymeric melt flow-controlling devices, they do not show controlling flow to obtain better flow properties by passing the melt through a novel flow guiding path, which converts the tubular flow of the melt to stream flow, then back to tubular flow, as in the instant invention.

SUMMARY OF THE INVENTION

This invention is a method of and apparatus for controlling polymer flow prior to extrusion in making tubes of plastic film having improved physical properties.

In the manufacture of plastic film for a variety of uses, it is known to improve its characteristics by controlling flow of the polymeric material in the extrusion apparatus prior to forming the tubular film. This is usually done by feeding or guiding the heated polymeric material, i.e., the polymeric melt, by a helical or spiral flow controlling device.

Nonetheless, in making such films by known methods, the tube of film as formed usually has one or more zones or areas of greater or lesser thickness than the rest of the tube (i.e., gauge variations) which are caused by polymer flow imperfections or variations, which, in turn, create non-uniform patterns of the polymeric material in the extruding device.

In the extrusion of polymeric materials in web or tube form, it is known that gauge or thickness of the film, its unit weight and roll formation characteristics of the tube are all directly controlled by or determined by the uniformity of flow of the polymeric material through the extrusion die and other parts of the extrusion apparatus, such as the die adapter which is positioned intermediate the usual screw-type feeder and the extrusion die head. For example, when the tube is wound, any continuing, standing tube gauge variation lie one atop the other so that in cumulative effect a hard hand is built up, which distorts the roll, thereby impairing its utility and causing waste. Furthermore, stagnate areas of the flow path in the die adapter and the extruding die head are undesirable since the polymeric material degrades and causes poor quality film to be produced, especially when particles of degraded polymer are extruded. This causes film breaks and undesirable film appearance.

This invention is directed to a method of and apparatus for making film by extrusion and, more particularly, to a method of and apparatus for moving the polymeric material in a novel manner in the extruding device by use of a novel flow guiding means which assures more uniform flow of the polymer.

By following the method of this invention and by using the novel flow guiding or controlling device thereof, polypropylene and polyethylene films of excellent properties and gauge uniformities may be produced capable of meeting untold numbers of use requirements.

BRIEF DESCRIPTION OF THE DRAWING

FIG. 7 is a flight development view of the flow controlling means of the die adapter of FIG. 6; and FIGS. 8 and 9 are graphs showing performance results using the novel extrusion apparatus of this invention.

DESCRIPTION OF THE PREFERRED EMBODIMENTS

Figure 1:
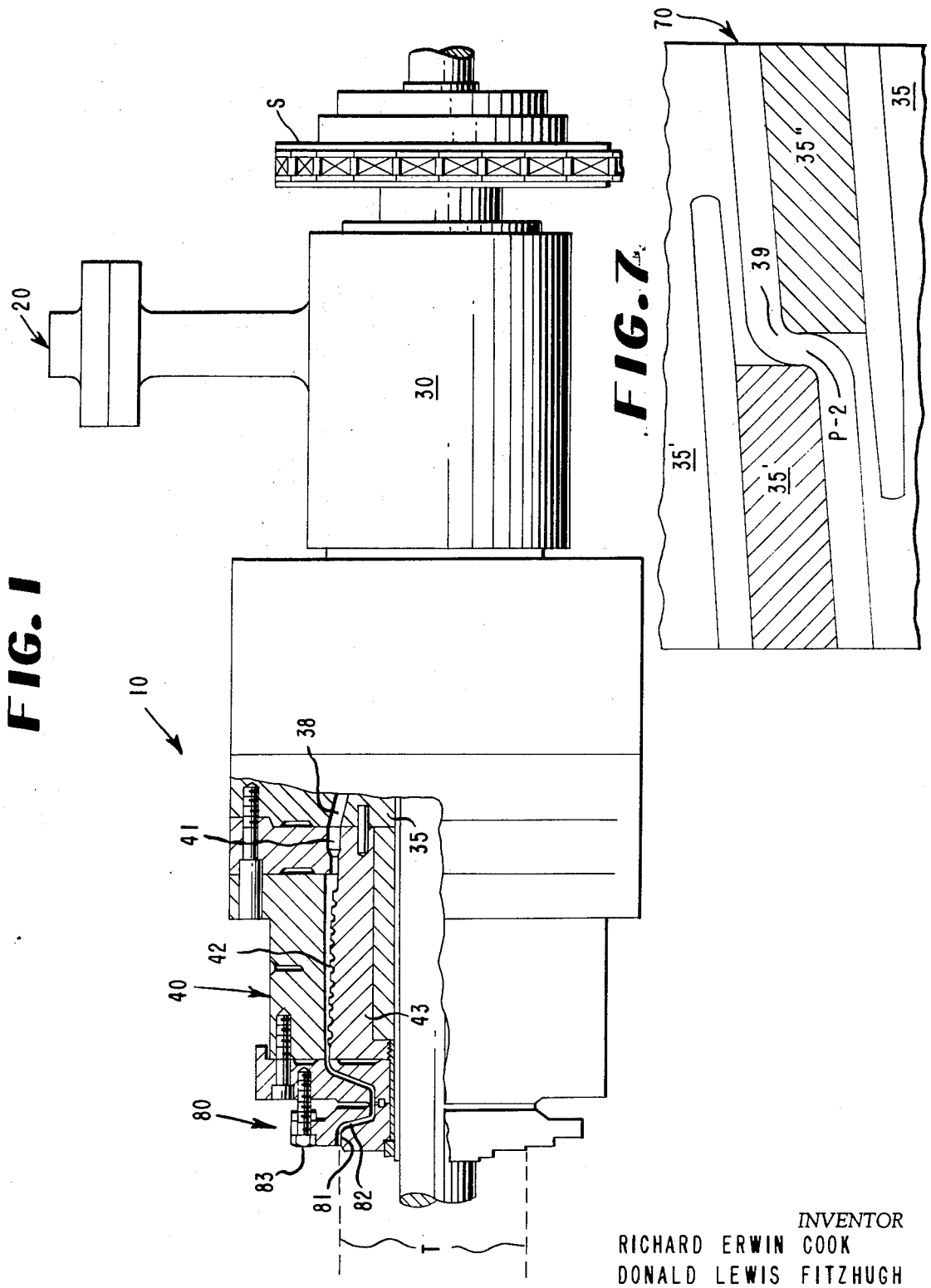
FIG. 1 is a side elevational view of an extrusion apparatus of this invention showing a polymeric material infeed means and extrusion die operatively connected together by a novel die adapter of such invention.

Referring to the drawing, there is shown an apparatus 10 of this invention for feeding flowable polymeric material and extruding such material in the form of a tube T of plastic film, such as polypropylene film, to provide film having enhanced physical properties.

Figure 2:
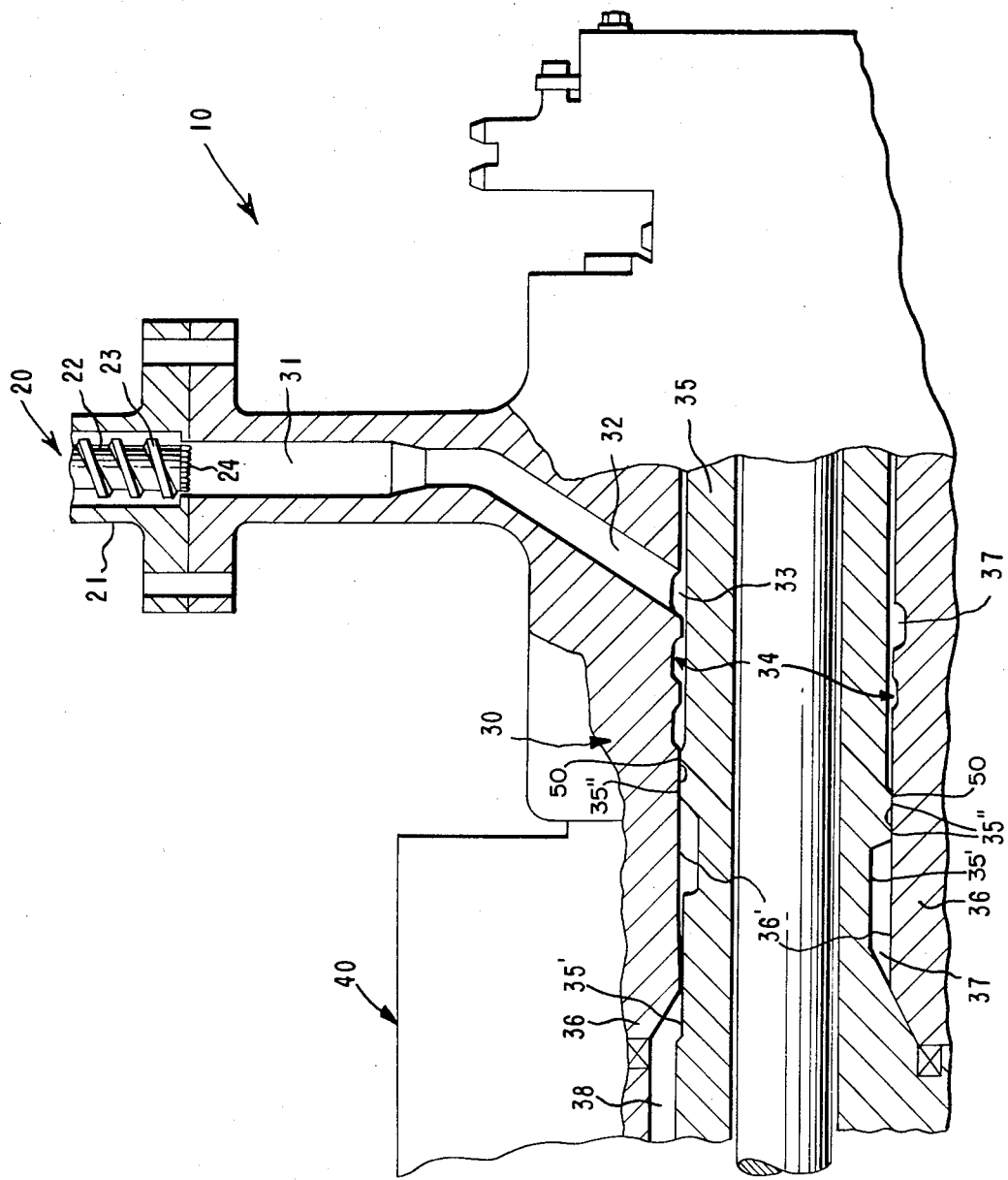
FIG. 2 is a cross-sectional view showing, in detail, the die adapter portion of the extrusion apparatus with its novel polymeric material flow controlling means.

Referring to FIGS. 1 and 2 in particular, it will be seen that polymeric material is supplied to the apparatus 10 of this invention from a supply source, not shown, and moved or fed by a polymer or polymeric material infeed means 20 into a die adapter 30 through which the polymer flows in a novel path to an extrusion die 40, from which the polymer is extruded in the form of a tube T.

The die adapter 30 is interposed between the infeed means 20 and the cross-head extrusion die 40 and operatively connects them together whereby molten polymer, not shown, forced from the infeed means 20 flows first through die adapter 30 and through the extrusion die 40 from whence it issues in tubular form T.

Referring to FIG. 2 in particular, it will be seen that the polymeric material infeed means 20 may be of any suitable conventional design, such as a screw-type infeed means having a cylindrical outer part 21 and a screw-type advancer 22 mounted for rotation within the outer part 22 to advance polymeric material in flowable form by means of flights 23 from an infeed means inlet port, not shown, to an infeed means exit port 24.

The polymeric material fed in melt form from the infeed means 20 flows into and through the die adapter 30 which changes its course or direction about 90°. The molten polymer enters the die adapter 30 by a conduit 31, hence to a conduit 32 which gradually alters the course of the material as shown in FIG. 2. The polymeric material flows through conduits 31 and 32 in the die adapter 30 and through an inlet 33 and into polymer flow control means, generally designated 34, in the die adapter which is constructed and arranged to complete the change in direction of the polymer flow from that in substantial alignment axially with the infeed means 20 to that in substantial alignment with the extrusion die 40. The flow control means 34 of the die adapter 30, as shown in FIG. 2, is in direct communication with flow channel 32 in a manner adapted to permit flow of polymeric material through outlet 33 and directly into the flow control means 34. If desired, the die adapter 30 or associated parts may be provided with the plurality of inlets, not shown, which are in direct or indirect communication with the flow control means 34 for distributing the polymeric material substantially completely therearound and therewithin, as shown, for example, in U.S. Pat. No. 3,418,678 to Albert.

Figure 3:
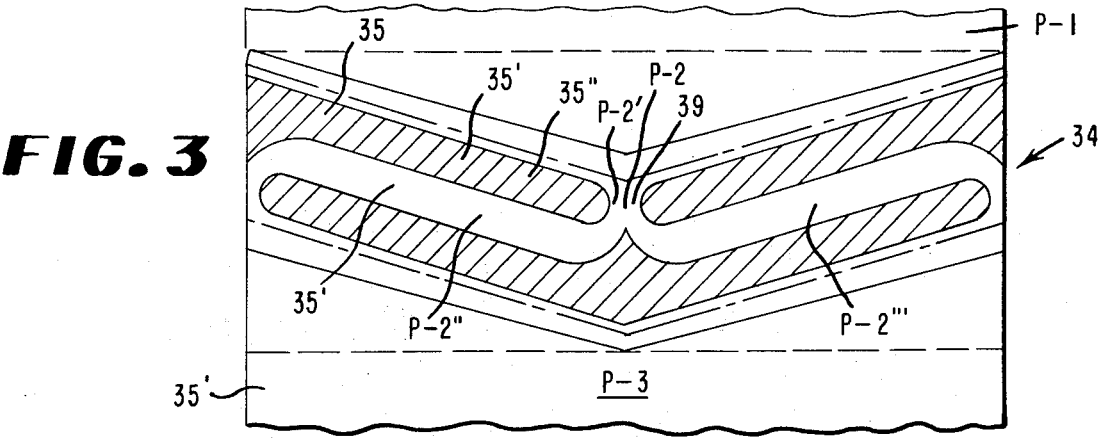
FIG. 3 is a flight development view of flow paths of the polymeric material flow controlling means of FIG. 2 wherein the cross-hatched area represents that portion of an inner member of the die adapter in substantial contact with a wall of an outer member of the die adapter.

As best seen in FIG. 3, the flow control means 34 includes a rotatable inner member 35 and a stationary outer member 36 having surfaces 36' and 37' defining a polymeric material flow channel 37 therebetween adapted to force the polymeric material to flow in a novel manner and in novel paths in its travel through the die adapter 30 to the die head 40, as will be explained.

The die adapter 30 is provided with a plurality of discharge passages 38 as, for example, eight passages near its terminal end. These discharge passages 38 are equally radially distributed about the central axis of the die adapter 30 and communicate with the entrance passages 41 located internally of extrusion die 40 so as to permit flow of the polymeric material therethrough. The die 40 is attached to the discharge end of the die adapter 30. There may also be a helical flow of distribution of polymeric material within the extrusion die 40 as it travels through the polymeric material flow channel 42 in such die 40 from which it is extruded in tubular form T, as shown in FIG. 1.

The extrusion die 40 is removably secured to the die adapter 30 in a suitable manner; for example, the die 40 may be mounted for rotation in the manner shown in FIG. 1 by securing the internal portion 43 thereof to the inner member 35 of the die adapter 30 which extends axially completely through the die adapter 30, and is provided at its other end with suitable means, as, for example, a sprocket S for connection to a chain drive assembly, not shown.

The outer surface 35' of the inner member 35 cooperates with opposite inner surface 36' of the outer member 36 to define the novel polymer flow channel 37 of the flow control means 34 between them. The polymer flow channel 37 as defined by these outer and inner surfaces 35' and 36' includes:

a first flow path P-1 generally in the form of an annular or tubular flow path defined by portions of the surfaces 35' and 36' of the inner and outer members 35 and 36 which are spaced from each other substantially throughout the length of the path, which path P-1 is substantially parallel to the flow channel 42 in the die 40;

a second flow path P-2 communicating with the first flow path P-1 and generally in the form of a constricted flow path defined by portions of the surfaces 35' and 36' of the inner and outer members 35 and 36 in which there is substantial contact, as at 50 in FIG. 2, between the surface portions to define a groove or a single rotating flow passage 39 therebetween which changes the polymer flow from tubular in the first path P-1 to a stream flow in the second path P-2 which is substantially parallel to the first flow path P-1; and a third flow path P-3 communicating with the second flow path P-2 and generally in the form of a tubular flow path defined by portions of the inner surfaces 35' and 36' and outer members 35 and 36 which are spaced from each other substantially throughout the path length and which third path P-3 is substantially parallel to the first and second flow paths P-1 and P-2.

The helix flow path forces all the polymeric material to flow into the single rotating helix groove 39 since the helix has decreasing clearance between the helix thread 35" until the helix thread is in substantial contact with the wall 36' of the outer member 36 for at least one revolution. Following, there is an increasing clearance between the thread 36" and the wall 36' of the outer member 36 and an accompanying increased flow of polymeric material in the axial direction.

The depth of the groove 39 of the helix correspondingly increases to a maximum depth at the position of substantial contact of helix threads and then again correspondingly decreases as the polymer moves axially toward the die 40. Similarly, the land crest of the helix increases, remains at a maximum at the position of substantial contact and then decreases.

It is seen, therefore, that the inner and outer members 35 and 36 of the die adapter 30 in complementary relationship provide an interrupted tubular path or channel 37 for progressively moving molten thermoplastic polymer through the die adapter 30.

In the preferred embodiment, the inner member 35 of the adapter 30 rotates and the outer member 36 of the adapter is stationary. The rotatable helical groove 39 which is located at a position intermediate the side inlet 33 and the die 40 is formed between external threads 35" of the surface 35' of the inner member 35 facing the surface 36' of the outer member 36. The outer portions of external threads 37" are in substantial contact with the outer member 36 as at 50. The external threads in substantial contact with the wall or surface 36' of the outer member 36 normally exceeds slightly more than one full revolution. Thus, as best seen by referring to FIGS. 2 and 3, where the threads 35" are in substantial contact with the wall 36' of the outer member 36, the tubular path P-1 is interrupted and all polymeric flow must pass through the groove or stream path P-2 formed by the helical threads 35''. After the polymeric flow has passed through an effective revolution, the flow then, as the helical portion runs out, begins to have progressively increasing axial flow in the tubular path P-3.

Thus, it can be readily visualized that all polymer which has been flowing in the tubular path P-1 is forced through the single rotating flow path P-2 before being permitted to flow axially again in tubular path P-3 and hence to the ultimate tube formation; therefore, the important criterion for reducing gauge weight variation and in obtaining other desired film properties in extruded film made from polymeric material having improved flow characteristics is that all the polymer flow through a relatively narrow passage or path P-2 that rotates at a given programmed velocity as will be explained.

The preferred flow path 34 of the present invention is best illustrated in FIGS. 2 and 3. As there shown, the interruption in the tubular channel 37 is created by a single flow passage P-2' which then is split into two flow passages P-2'' and P-2''' which in turn flow into the third tubular flow path P-3. Hence, in path P-2, the outer surface portions 35' of the inner member 35 in substantial contact with the inner wall 36' of the outer member 36 forces all polymer through a single rotating axial inlet and then splits the polymer flow for helical movement before resuming axial tubular flow.

Figure 5:
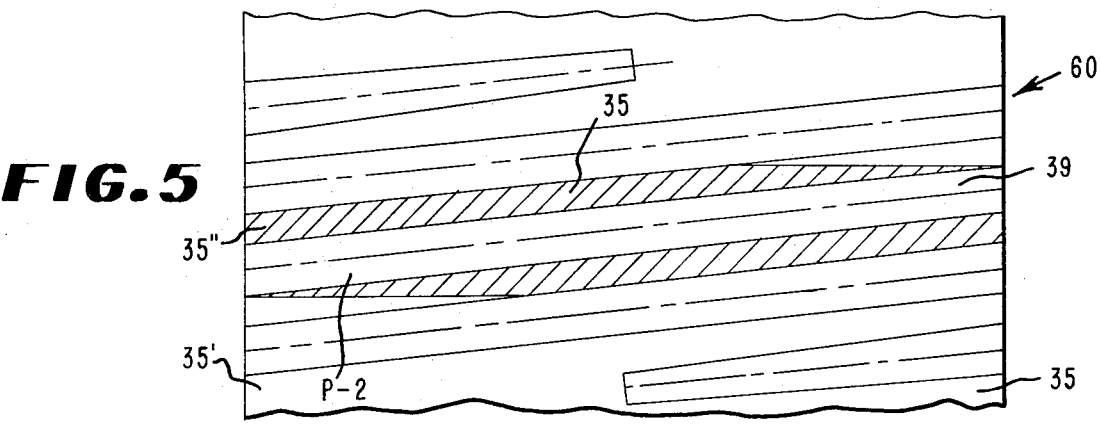
FIG. 5 is a flight development view of the flow controlling means of the die adapter of FIG. 4.
Figure 4:
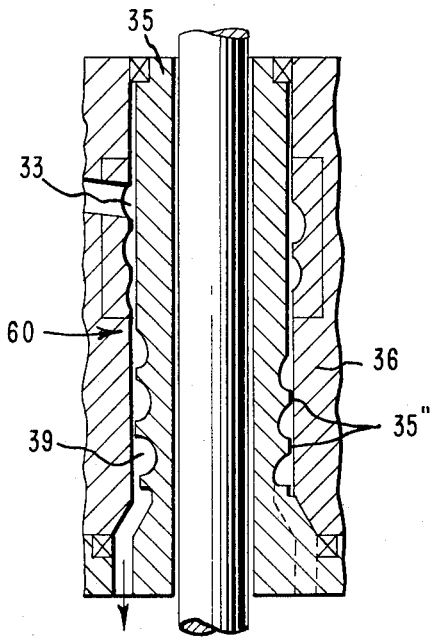
FIG. 4 is a partial cross-sectional view of a modified die adapter of an extrusion apparatus of this invention.

A modified flow controlling means 60, in the form of a single helix, is shown in FIGS. 4 and 5 for interrupting the tubular polymer flow in a die adapter. The inner member 35 has external thread portions 35'' in substantial contact with a wall of the outer member 36. The extruder pressure moving the molten thermoplastic polymer through the apparatus forces the polymer in through the inlet 33 and around the inner member 35 in a tubular flow pattern. The pressure then forces the polymer from the tubular passage through the groove 39 formed by the external threads 35'' on the inner member 35. The external thread portion extends slightly more than one full revolution about the inner member before the external thread begins to decrease in height and length. Thus, the polymer is forced to flow through the single rotating lead inlet 39 of the second flow path P-2 before beginning the progressively increasing axial flow toward the die 40. The polymer flow pattern may be more readily visualized by noting the corresponding flight development of the helix on the inner member 35 by referring to FIG. 5.

Figure 6:
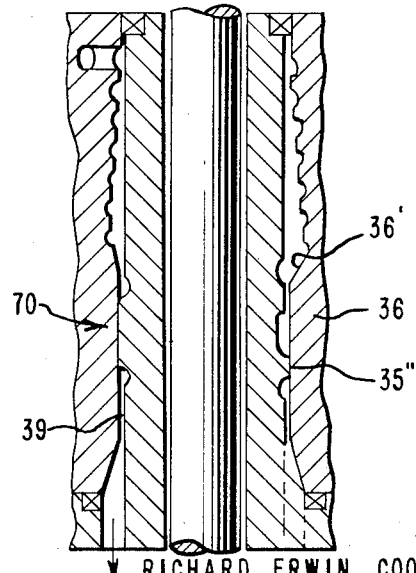
FIG. 6 is a partial cross-sectional view of another modified die adapter of an extrusion apparatus of this invention.

Another variation of the present invention is illustrated in FIGS. 6 and 7, wherein the interruption of the polymer flow is caused by a modified flow controlling means 70. In this case, the external portion 35'' of the inner member 35 in substantial contact with the wall 36' of the outer member 36 tends to force all polymer through a single axial inlet 39 prior to moving in a helical path. Again, though, the polymeric tubular passage is interrupted and the polymer is forced through the single rotating lead inlet of the second flow path P-2 before resuming tubular flow as best seen by referring to the corresponding flight development and polymer flow pattern, as shown in FIG. 7.

This rotation or constriction of all of the polymer at a given location substantially reduces standing gauge variation (i.e., the non-random weight or thickness variation in extruded film) in the final film. Thus, any potential standing gauge variation which has been introduced prior to this location will be minimized and converted to rotating gauge which can be randomized.

It is seen, then, that by controlling the flow of the polymer through the die adapter and by moving it in the novel channel 39 in such adapter, the tubular flow of the material is interrupted or changed to stream flow at an intermediate location in such channel and then converted back to tubular flow. This interruption of tubular flow and change to stream flow produces surprising and unexpected results in the finished film or extruded film by improving the flow characteristics of the polymeric material through the die adapter prior to extrusion of such film. In short, the improved polymer flow characteristics created by the interrupted flow method steps of this invention and by the novel guide path and novel flow controlling means of the apparatus of such invention produces more uniform and improved flow which, in turn, makes for an improved extruded film having enhanced and desired properties.

A comparison of the effectiveness of the apparatus of the present invention was made in the manner outlined in the following examples.

EXAMPLE 1

Polyethylene was extruded at a rate of 1,352 lbs./hr., at a melt temperature of 197° C., through a 32-inch-diameter annular die having a nominal 25-mil gap, and was drawn off at a rate of 85 yds./minute to produce a 1.5-mil film, utilizing stantially the apparatus of FIG. 2 of U.S. Pat. No. 2,987,765 to Cichelli and in a manner similar to that described in column 4, line 45, to column 5, line 10 of such patent.

Initially, a conventionally rotating inlet die adapter section was employed substantially as that shown in FIG. 1 of U. S. Pat. No. 3,376,605 to Beattie. The resulting tubular film was slit into two rolls, identified as East and West. These rolls were subsequently slit into 8—8 inch wide rolls, 10¼ inch O.D., weighed and the percent deviation from the lightest roll noted (see upper graphs of FIG. 8).

The apparatus of this invention using the single lead rotating inlet as shown in FIGS. 4 and 5 was then installed in the equipment and a similar test run (see lower graphs of FIG. 8). It is readily apparent from the graphs that the single lead rotating inlet substantially improves the standing gauge weight variation in the extruded film.

EXAMPLE 2

In a similar manner to Example 1, polyethylene was extruded at a rate of 1,050 lb./hr. through a 32-inch-diameter annular die having a nominal 30-mil gap and was drawn off at a rate of 85 yds./minute to produce a 2.0-mil film.

Utilizing a conventional rotating inlet die adapter section, again, rolls were obtained and the percent deviation from the lightest roll noted (see upper graphs of FIG. 9).

Employing the single lead rotating inlet of FIGS. 6 and 7, a similar evaluation was made and is graphically illustrated in the lower graphs of FIG. 9.

Again, the substantial improvement in standing gauge weight variation is obvious.

In addition to rotating gauge randomization made possible by the novel flow controlling means of this invention, it is further possible to minimize this rotating gauge prior to randomization by combining such flow controlling means with a die lip adjustment means 80 in the extrusion die 40.

As best seen in FIG. 1, the extrusion die 40 includes spaced apart circular die lips 81 and 82 adjustable relative to each other by an appropriate means, such as adjusting bolts 83 to control gauge in the manner shown in U.S. Pat. No. 3,267,519 to Albert, for example. It is noted that the inner part of the extrusion die 40 and the die adapter 30 are fixedly connected together; therefore, by simply adjusting selective adjusting bolts 83, it is possible to control the standing rotating gauge at that area of the die lips 81 and 82. With this flexing lip-type arrangement, the small adjustments necessary to insure gauge uniformity at individual sections of the annular lip portion of the die 40 may be made readily.

We claim:

1. An apparatus for extruding polymeric material in the form of a tube of plastic film comprising:
   a polymeric material infeed means;
   an extrusion die having a flow channel for extruding said polymeric material in the form of said tube of plastic film;
   a die adapter operatively connecting said infeed means to said extrusion die and having means for controlling flow of said polymeric material therethrough including inner and outer members having surfaces defining a polymeric material flow channel therebetween, means for rotating said inner and outer members relative to each other, said infeed means forcing said material through the adaptor and through the die, said flow channel of said die adapter including
   a first flow path substantially parallel to said flow channel of said extrusion die and wherein the flow of the polymeric material is substantially tubular;
   a second rotatable flow path communicating with and substantially parallel to said first flow path and wherein the flow of the polymeric material is a stream, said second rotatable flow path being defined by portions of the surface of said inner member in substantial contact with portions of the surface of said outer member for at least one full revolution; and
   a third flow path substantially parallel to said first and second flow paths and communicating with said second flow path and said flow channel of said extrusion die and wherein the flow of the polymeric material is substantially tubular.

2. The apparatus of claim 1 wherein said second flow path includes a first flow passage and second flow passages communicating with each other.

3. The apparatus of claim 1 wherein portions of the surfaces of said inner and outer members are in substantial contact with each other whereby to interrupt the tubular flow in said first path and to convert it to stream flow.

4. The apparatus of claim 1 wherein portions of the surfaces of said inner and outer members define a helical groove having a single inlet connecting said first path to said second path.

5. The apparatus of claim 4 wherein said helical groove has a single outlet connecting said second flow path to said third flow path.

* * * * *